United States Patent [19]

Felix

[11] 4,420,238

[45] Dec. 13, 1983

[54] APPARATUS FOR ENABLING CONCEALING SURVEILLANCE BY USE OF A CAMERA IN A VEHICLE

[76] Inventor: Larry L. Felix, 1250 N. Manzanita, Canby, Oreg. 97013

[21] Appl. No.: 369,809

[22] Filed: Apr. 19, 1982

[51] Int. Cl.³ .................. G03B 37/02; G03B 29/00
[52] U.S. Cl. .................................. 354/81; 354/293; 352/243; 248/183
[58] Field of Search ............... 354/81, 293; 352/243; 248/179, 183, 184; 358/108

[56] References Cited

U.S. PATENT DOCUMENTS

| | | | |
|---|---|---|---|
| 1,451,382 | 4/1923 | Wescott | 248/183 |
| 1,701,800 | 2/1929 | Taylor | |
| 2,148,119 | 2/1939 | Grist | |
| 2,464,067 | 3/1949 | Barker | |
| 2,582,779 | 1/1952 | Hoge | 248/183 |
| 3,164,838 | 1/1965 | Heinrich | |
| 3,399,614 | 9/1968 | Fischer | 354/81 |
| 3,421,721 | 1/1969 | Miller | |
| 3,515,472 | 6/1970 | Schwitzgebel | |
| 3,568,583 | 3/1971 | Horberg et al. | 354/81 |
| 3,603,545 | 9/1971 | Boniface | 354/293 |
| 3,689,695 | 9/1972 | Rosenfield et al. | |
| 4,063,258 | 12/1977 | Allen | |
| 4,277,804 | 7/1981 | Robison | |

Primary Examiner—A. A. Mathews
Attorney, Agent, or Firm—Kolisch, Hartwell & Dickinson

[57] ABSTRACT

A system using a vehicle and a camera for effecting substantially undetected surveillance of a preselected target area includes a vehicle modified so that a wall portion thereof includes an opening simulated to appear as a side clearance light of the vehicle with the camera positioned internally of the vehicle, such as in the trunk, for viewing outwardly through the opening. A novel camera-mount assembly is disclosed for enabling the camera to be selectively panned and tilted and includes a support for holding the camera mounted above a base which may be positioned upon a surface such as the floor of the trunk. A first pivot mechanism is mounted on the base operable for selectively pivoting the support, relative to the base, about a substantially vertical, first pivot axis thereby to pan the camera. A second pivot mechanism interconnecting the base and the support is operable for selectively pivoting the support about a substantially horizontal, second pivot axis thereby to tilt the camera.

10 Claims, 5 Drawing Figures

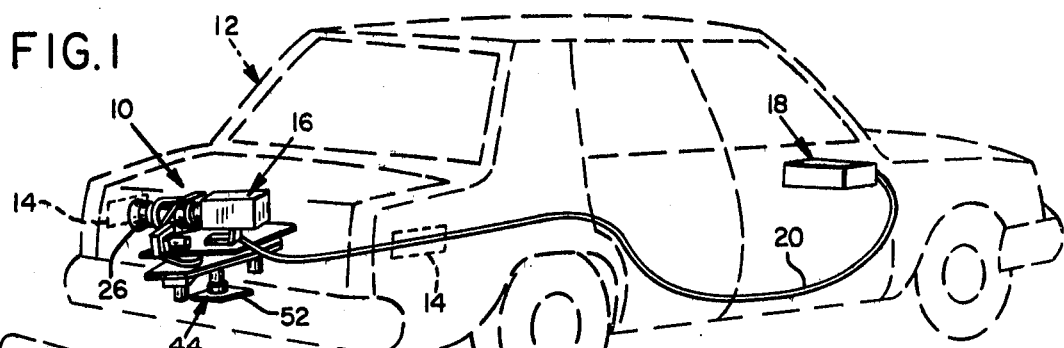
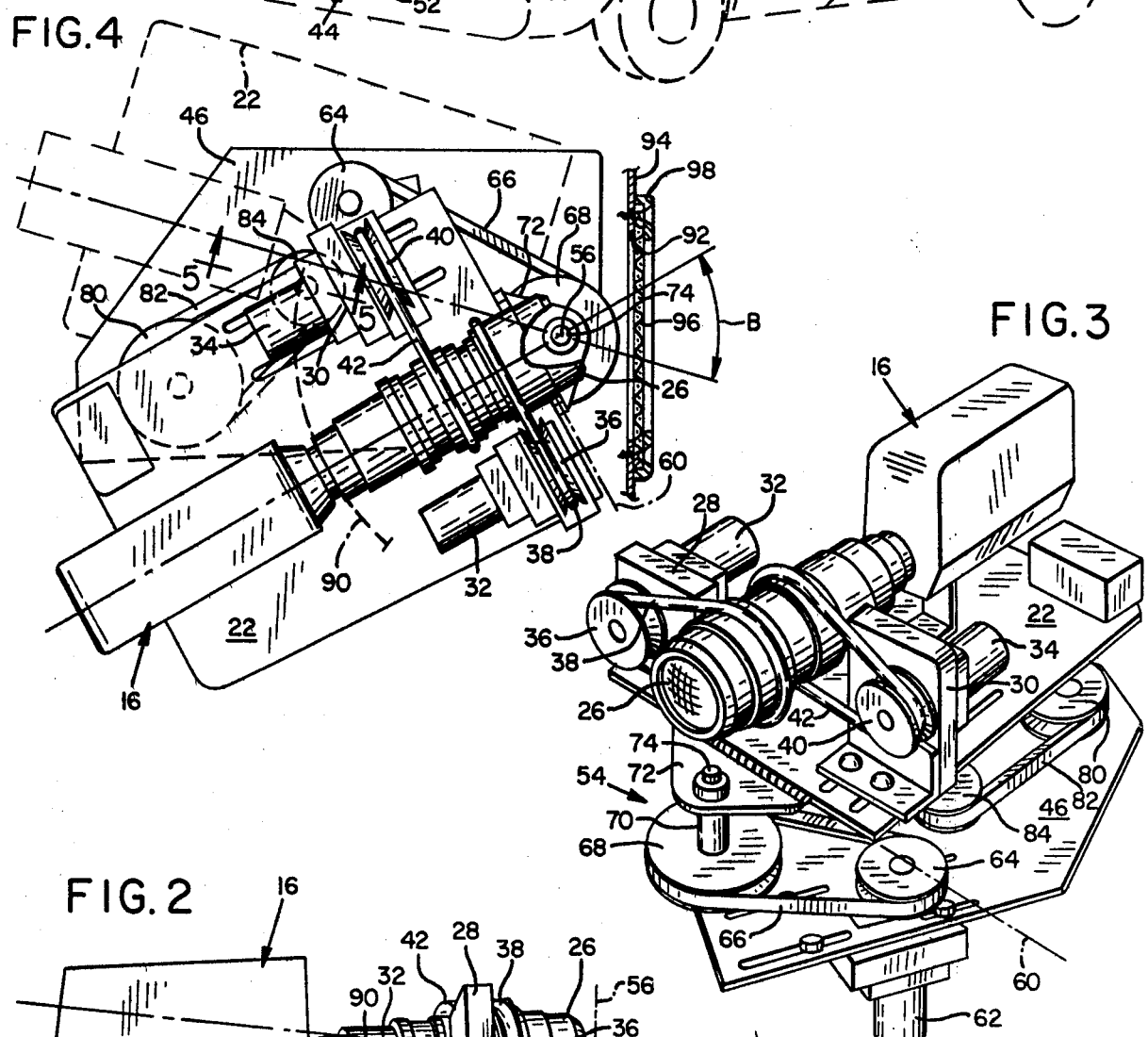
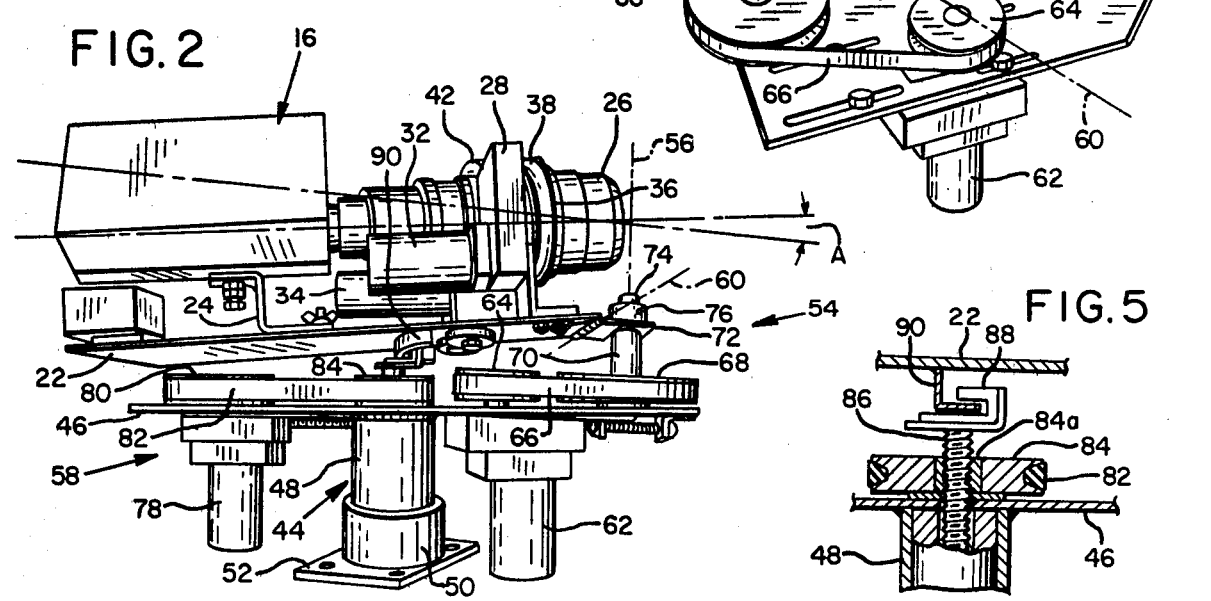
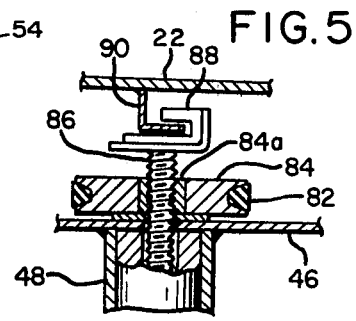

APPARATUS FOR ENABLING CONCEALING SURVEILLANCE BY USE OF A CAMERA IN A VEHICLE

BACKGROUND AND SUMMARY OF THE INVENTION

The present invention relates in its broadest sense to surveillance of clandestine activities, and more particularly to the desired viewing and recording of such activities by use of a camera concealed in a vehicle.

For reasons which are subject to considerable debate, commission of criminal acts in the United States, and certainly in other countries, seems to be continuously escalating. While it may be gainsaid that apprehending criminals and prevention of unlawful activities is best accomplished by an increase of police, it nevertheless remains an unfortunate fact of life that police numbers simply are not sufficient to apprehend criminals, let alone determine when criminal activity is "afoot". In attempts to ferret out criminal activity, police bureaus often station personnel in what are known as "stake-outs". A stake-out involves the use of police or detectives, hopefully concealed, who undertake surveillance to determine if criminal activity is taking place at a given location or is about to occur.

Typically, a stake-out may involve an officer or detective following suspected criminals or parking at a known location of criminal activity and observing events to determine if an arrest can be made. Certainly, criminals are able to observe law enforcement personnel who attempt to conduct surveillance while seated in a vehicle. Vehicles are often used because of their obvious mobility enabling law enforcement personnel to track or follow-up on criminal activity which may shift from one location to another. However, it is often the case that law enforcement personnel may be aware of the fact that criminal activity will occur in a certain location and wish to conduct surveillance of that location over an extended period of time without being detected. Of course, if law enforcement personnel must sit in the vehicle, they are constrained from doing other useful work and may be so incapacitated for hours on end.

There have been proposals in the prior art to conduct surveillance, in an undetected manner, from inside a vehicle such as a van. As set forth in U.S. Pat. No. 4,161,352, issued to the present applicant, a vehicle mounted surveillance apparatus is disclosed which contemplates mounting an extendible-retractable scope for selective shifting through a wall opening in a vehicle such as a van. More specifically, that patent utilizes a periscope which is mounted for shifting upwardly through an air vent positioned in the roof of the vehicle. An observer, located within the van, may use the scope, which incorporates opposed reflecting surfaces, to view activity occurring outside of the van. The top of the scope, or that portion which extends through the top vent of the van, includes a cover which provides at least minimal camouflage.

While the above type of surveillance apparatus has met with considerable success, it unfortunately may be the case that criminals have learned of the use of vans in surveillance and as such, are circumspect in their activity if a van-type vehicle is seen in a particular location.

Accordingly, with the disadvantages of known surveillance systems kept in mind, it is a general object of the present invention to provide a novel vehicle-camera system for use in effecting substantially undetected surveillance of a preselected target area. In its broadest terms, the present invention contemplates mounting a camera, with suitable recording gear, within a vehicle, such as an ordinary passenger car, so that the camera may record events taking place within the aforementioned target area.

To this end, the present invention is directed to a novel camera-mount assembly which enables positioning of a television or other type of recording camera in a concealed space of a passenger car, such as the trunk, for viewing through an opening provided in the rear fender wall of the trunk. The opening is camouflaged to simulate a side clearance light of a vehicle and the camera may be controlled by use of a conventional monitor or control unit which may be mounted in the glove box of the passenger car or positioned beneath the front seat.

Another object of the present invention is to provide a camera-mount assembly which enables a camera to be selectively panned and tilted so that activity over a given target area range may be perceived and recorded. That objective is achieved by providing a camera mount which includes a support for securely holding the camera mounted above a base. The base is supported on a surface such as the trunk of a vehicle, and is provided with a first power-driven means for operating a pivot means which selectively pivots the support, relative to the base, about a substantially vertical, first pivot axis thereby to pan the camera. A second power-driven means is operable for selectively pivoting the support about a second pivot means interconnecting the base and the support to provide tilting about a substantially horizontal, second pivot axis.

Another object of the present invention is to provide a camera-mount assembly, as described above, in which a compact, integral unit is provided for quick and easy mounting on the trunk floor of a vehicle. That objective is accomplished by providing a base which includes a pedestal slideably insertable within a sleeve-like mount, which mount is suitably configured for affixation to the trunk floor of the vehicle.

These and additional objects and advantages of the present invention will be more readily understood after a consideration of the drawings and a review of the detailed description of the preferred embodiment.

BRIEF DESCRIPTION OF THE DRAWINGS

FIG. 1 is a perspective, schematic view of an automobile, viewed somewhat from the rear thereof illustrating positioning of a camera-mount assembly in accordance with the present invention so that observation of activities outside of the vehicle may be recorded by means of a recording deck and control unit connected to the camera;

FIG. 2 is an isolated, perspective view of a camera-mount assembly;

FIG. 3 is a side elevational view of the camera-mount assembly;

FIG. 4 is a top plan view of the camera-mount assembly; and

FIG. 5 is a cross-sectional view taken along lines 5—5 of FIG. 4 showing features of an elevating device for effecting tilt.

DETAILED DESCRIPTION OF THE PREFERRED EMBODIMENT

As stated at the outset herein, it is a principle object of the present invention to provide a camera-mount assembly specifically adapted for mounting in a vehicle, such as an automobile, in order to effect undetected surveillance of activities occurring at a target area outside of the vehicle. It is desired to provide such a camera-mount assembly which will enable the positioning of a camera within the trunk of a conventional vehicle, such as a passenger car, with the mounting assembly enabling suitable panning and tilting of the camera to record events over a fairly broad range. In order for the camera to record events from within a small enclosed space, it must "peer" through an opening provided in the side of the vehicle, such as adjacent the rear fender, with the opening being camouflaged to simulate a side clearance light of the vehicle. The lens of the camera must be positioned close to the opening if panning and tilting are to be effective.

Turning now to FIG. 1 of the drawings, a camera-mount assembly, in accordance with the present invention, is generally indicated at 10 shown mounted in the trunk of a vehicle, such as a passenger car, indicated in dashed outline schematically at 12. Also shown very schematically is an opening 14 in the side of the trunk through which the camera is positioned to view. Details of the opening and how it is camouflaged to simulate a side clearance light will be described at a later point. The camera-mount assembly basically includes a novel mount for enabling selective panning and tilting of a camera which is generally indicated at 16.

A conventional control box/monitor, indicated at 18 may be suitably positioned either in the glove box of the vehicle or underneath the front seat. Such a control box/monitor is operably connected by means of control wires, schematically shown at 20, to camera 16 as well as various power-driven means, to be subsequently described, for controlling the panning and tilting action as well as focus and "zoom" capabilities of the camera. The control box/monitor includes not only the aforementioned controls, but also may be provided with a viewing screen and a recording deck for continuously recording events occurring outside of the vehicle during unmanned intelligence gathering operations.

With attention now directed to FIGS. 2 and 3 of the drawings, it can be seen that camera 16 is positioned on a support means 22 which securely holds the camera by means of a suitable bracket 24. As shown in FIG. 3, camera 16 is positioned on support means 22 so that the lens of the camera, indicated at 26, is positioned adjacent a front edge of the support means. Extending upwardly from support means 22 are a pair of laterally positioned mounting brackets, such as indicated at 28, 30 which serve to mount associated electric motors 32, 34. The motors, as are all power-driven devices to be described hereinafter, are actuated by suitable control mechanisms in the control box/monitor. Motors 32, 34 are coupled by means of pulleys and cord-type belts for suitably operating camera 16 in a selected focus and "zoom" modes. For instance, motor 32 is coupled by means of pulley 36 and belt 38 so as to vary the focus of camera 16 and motor 34, operably connected by means of pulley 40 and belt 42 to the camera, can provide "zoom" capabilities.

Returning to a consideration of FIG. 2, it can be seen that support means 22 is positioned above what will be referred to generally as a base means 44. The base means is constructed for suitable positioning upon a surface such as the trunk floor of a vehicle. To this end, base means 44 includes a plate member 46 (positioned substantially parallel to support means 22) from which downwardly extends a cylindrical pedestal means 48. Dimensioned to suitably receive the pedestal means is a mounting sleeve 50 which is rigidly secured to a base plate 52 provided with suitable apertures to enable rigid attachment by screws or bolts to the trunk floor of the vehicle. It is contemplated that pedestal means 48, which is slideably and detachably removable from sleeve 50, may be removed as desired and positioned in another mounting sleeve-base plate arrangement provided on the opposite side of the trunk of a vehicle for viewing through another or opposite simulated side clearance light as desired.

As mentioned previously, it is a principle object of the present invention to provide a camera-mount assembly which permits selective panning and tilting of the camera. To this end, a first pivot means, generally indicated at 54 is mounted on base means 44, and more particularly, on plate member 46, for selectively pivoting support means 22, relative to the base means, about a substantially vertical, first pivot axis 56 thereby to pan the camera. First pivot axis 56 may therefore be thought of as a pan axis. Furthermore, a second pivot means, generally indicated at 58, interconnects base means 44 and support means 22 and is operable for selectively pivoting the support means about a substantially horizontal, second pivot axis 60 thereby to tilt the camera. The second pivot axis is also shown in FIGS. 3 and 4 at 60.

Considering in further detail first pivot means 54, it can be seen that it includes a power-driven means and suitable coupling for engaging support means 22 to provide the aforementioned pivoting about first pivot axis 56. More specifically, a first power-driven means, such as electric motor 62 is mounted beneath plate member 46 and is operable for driving a pulley 64 coupled via a belt 66 to a second pulley 68. The second pulley includes a hollow shaft 70 extending upwardly therefrom. Shaft 70 is interconnected rigidly to what will be referred to as a transfer means or member 72.

The transfer member is pivotally connected to support means 22 for defining second pivot axis 60 and for also transferring motion from pulley 66 and shaft 70 to support means 22. A pin 74 extends through an aperture provided in transfer member 72 and also extends axially through hollow shaft 70. The bottom of the pin is rigidly connected to plate member 46 and pulley 68 is suitably journalled thereon. A retaining collar 76 includes a set screw so that it may be clamped to pin 74 to secure the arrangement together.

Thus, it can be seen that first power-driven means 54, which includes motor 62 and the associated pulleys, etc., is operable for imparting rotation, about first pivot axis 56, to the transfer member and thereby to support means 22.

Turning now to a more detailed description of second pivot means 58, it can be seen that it includes an electric motor 78 mounted for suspension beneath plate member 46. Motor 78 is operably connected to a pulley 80, which in turn, by means of belt 82, is connected to another pulley 84. With reference now directed to FIG. 5, details of the special construction of pulley 84 and its interconnection to what will be referred to as an elevator means will be now described. As shown in FIG. 5, pulley 84 is provided with internal threads such as indicated at 84a for threadably engaging an elongate threaded shaft 86. It can be seen that threaded shaft 86 is secured to a slide member 88 which engages a track means, of arcuate configuration, shown at 90. The slide member may be formed of suitably low friction material such as hardened plastic or the like, and during panning of camera 16, slide member 88 follows the arcuate form of track means 90.

It can be seen that threaded shaft 86 extends downwardly through pedestal means 48 and functions as an elevator means, in conjunction with pulley 84, which may be thought of as a nut means. Upon suitable actuation of motor 78, the elevator means, which includes pulley 84 (the nut means) and extendible-retractable member or a threaded shaft 86, operation is provided for selectively elevating or lowering support means 22 thereby to tilt the support means about second pivot axis 60. An angle of such tilt is indicated at A in FIG. 2 and an angle of panning is indicated at B in FIG. 4.

Consideration will now be given to the manner in which a side opening is camouflaged to simulate a side clearance light. As referred to at the outset herein, it is preferable to mount the assembly in the trunk of a passenger car. A suitable opening is cut in the rear side of the car at one or both of the rear fender areas at the existing location of the side clearance lights or at new locations. As shown in FIG. 4, the camera is suitably mounted on the floor of the vehicle with lens 26 positioned to face outwardly through an opening 92 cut in a side of the vehicle indicated at 94. A screen, of wire mesh, colored red or orange is placed on the outside over the opening and a frame or suitable cover, indicated at 98 is suitably fastened to the outside of the car body over the screen and opening. While not specifically shown in FIG. 4, a glass window may be provided on the inside of the opening.

The net result is that with the camera-mount assembly of the present invention, there is provided an arrangement or system utilizable in effecting substantially undetected surveillance of a preselected target area. It can be appreciated that with a remote control box/monitor, such as indicated at 18, a selected target area may be observed and events recorded without an individual's presence being required in vehicle 12. The remote control unit can be set up to have camera 16 continuously panned and tilted to "sweep" a target area for continuous, undetected surveillance and recording of activities. Many conventional video systems can be operated for relatively long time periods and tape decks enable recording of up to six hours of activity.

A typical example of how the arrangement of the present invention may be used will now be set forth. Assume that law enforcement officials suspect that illegal activities, i.e., drug transactions, exchange of contraband, etc. are occurring adjacent a certain downtown location. While foot police are easily recognizable, it must be understood that a parked car with an individual seated therein also becomes recognizable by those individuals embarking on criminal activity. However, a vehicle equipped with a camera-mount assembly as above described, enables a law enforcement official to park the vehicle, so that either the right or left side thereof, depending on the situation, faces what will be thought of as the "target area".

With the camera-mount assembly of the present invention disposed within the trunk of the vehicle so that the camera's lens is positioned to view outwardly through the simulated side clearance light, continuous surveillance and recording of events may be effected without requiring the presence of law enforcement personnel. It really does not need much persuasion to convince one of the attendant advantages of such a camera-mount assembly and the basic concept of mounting a camera in the trunk of a vehicle with the viewing port of the camera being a simulated or camouflaged side clearance light.

While certain of the advantages of the present invention have been described above, it is felt necessary to emphasis additional features of the specific camera-mount assembly itself. First of all, an integral compact unit, especially adapted for floor mounting in the trunk of a vehicle, is provided. While reference has been made to the floor or trunk of a vehicle, it should be appreciated that the camera-mount assembly as described above enables mounting of the camera on any relatively flat surface such as the bed of a pick-up, positioning in a tool box, assuming the tool box has a viewing window, etc. By "compact arrangement", it is meant than an assembly for panning and tilting a camera is provided as a unit which may be easily transported or shifted.

One of the principle advantages of the camera-mount assembly of the present invention resides in the fact that the construction mounts the lens of the camera so that during panning action, the lens is closely adjacent (preferably intersecting) the pan or first pivot axis 56 as shown in FIGS. 3–4 and particularly FIG. 4. This enables the lens of the camera to be positioned very close to the opening provided in the side wall of the vehicle. If the pivoting or panning of the camera did not occur about a forward portion thereof, i.e., if the panning did not contemplate pivoting the camera basically about its lens region, it can be seen that it would not be possible to place the lens of the camera close to the inside opening of the simulated side clearance light. By providing the construction, as described above, the lens can "peer through" the opening and during panning action, be presented to view a relatively wide target area. This is especially important when it is realized that most trunks are quite small.

Similarly, it can be appreciated that the tilt or second pivot axis 60 is also closely positioned adjacent lens 26 as shown in FIGS. 3–4 and particularly FIG. 4. Of course, it should be appreciated that providing the tilt axis proximal to the lens enables tilting of the lens closely adjacent to the inside opening of the simulated side clearance light. If tilting occurred at some more rearward location along camera 16, it can be seen that an extremely large opening would have to be cut in the side wall of a vehicle, which of course would not simulate a side clearance light and would destroy the inherent concealment concept of peering through what would be a side clearance light or simulated side clearance light.

While the present invention has been shown and described with reference to the foregoing preferred embodiment, it will be understood by those skilled in the art that other changes in form and detail may be made therein without departing from the spirit and scope of the invention as defined in the appended claims.

It is claimed and desired to secure by letters patent:

1. A camera-mount assembly for enabling a camera to be selectively panned and tilted comprising:
   support means for securely holding the camera;

base means disposed adjacent said support means for positioning upon a surface;

first pivot means mounted on said base means operable for selectively pivoting said support means, relative to said base means, about a substantially vertical, first pivot axis disposed to extend substantially adjacent the camera lens thereby to pan the camera;

second pivot means interconnecting said base and support means operable for selectively pivoting said support means about a substantially horizontal, second pivot axis thereby to tilt the camera;

transfer means pivotally connected to said support means for defining said second pivot axis and for transferring motion from said first pivot axis to said support means;

said first pivot means including first power-driven means operable for imparting rotation, about said first pivot axis, to said transfer means and thereby to said support means; and said second pivot means including second power-driven means drivingly coupled to an elevator means operable for selectively elevating and lowering said support means thereby to tilt said support means about said second pivot axis.

2. The camera-mount assembly of claim 1 wherein said transfer means extends from a frontal location of said support means, said first power-driven means including a rotatable shaft rigidly coupled to said transfer means.

3. The camera-mount assembly of claim 2 wherein said elevator means includes an extendible-retractable member for engaging an undersurface of said support means.

4. The camera-mount assembly of claim 3 wherein said support means includes track means, of arcuate configuration, for continuously engaging said extendible-retractable member during pivoting of said first support means about said first pivot axis.

5. The camera-mount assembly of claim 4 wherein said second power-driven means is operably connected to a nut means, said extendible-retractable member being defined by an elongate threaded shaft threadably engaging said nut means so that operation of said second power-driven means effects motion of said threaded shaft relative to said nut means.

6. An arrangement for enabling substantially undetected surveillance of a preselected target area comprising:

a vehicle modified so that a wall portion thereof includes an opening;

a camera-mount assembly positioned within the vehicle so that the lens of the camera is directed to view outwardly through the opening, the camera-mount assembly further including a mounting means for enabling selective pivoting of the camera about a substantially vertical, first pivot axis disposed to extend substantially adjacent the camera lens thereby to pan the camera and also about a substantially horizontal, second pivot axis thereby to tilt the camera;

said camera-mount assembly including support means for selectively holding the camera and base means disposed adjacent said support means for positioning upon a surface, wherein first pivot means are mounted on said base means operable for selectively pivoting said support means, relative to said base means, to thereby pan the camera, and second pivot means interconnecting said base and support means operable for selectively pivoting said support means about said second pivot axis thereby to tilt the camera;

transfer means pivotally connected to said support means for defining said second pivot axis and for transferring motion from said first pivot means to said support means;

said first pivot means including first power-driven means operable for imparting rotation, about said first pivot axis, to said transfer means and thereby to said support means; and said second pivot means including second power-driven means drivingly coupled to an elevator means operable for selectively elevating and lowering said support means thereby to tilt said support means about said second pivot axis.

7. The arrangement of claim 6 wherein said transfer means extends from a frontal location of said support means, said first power-driven means including a rotatable shaft rigidly coupled to said transfer means.

8. The arrangement of claim 7 wherein said elevator means includes an extendible-retractable member for engaging an undersurface of said support means.

9. The arrangement of claim 8 wherein said support means includes track means, of arcuate configuration, for continuously engaging said extendible-retractable member during pivoting of said first support means about said first pivot axis.

10. The arrangement of claim 9 wherein said second power-driven means is operably connected to a nut means, said extendible-retractable member being defined by an elongate threaded shaft threadably engaging said nut means so that operation of said second power-driven means effects motion of said threaded shaft relative to said nut means.

* * * * *